(12) United States Patent
Wildgen

(10) Patent No.: US 6,350,630 B1
(45) Date of Patent: Feb. 26, 2002

(54) METHOD FOR ATTACHING A MICROMECHANICAL SENSOR IN A HOUSING AND SENSOR ASSEMBLY

(75) Inventor: Andreas Wildgen, Nittendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/390,166

(22) Filed: Sep. 7, 1999

(30) Foreign Application Priority Data

Sep. 7, 1998 (DE) .......................... 198 40 829

(51) Int. Cl.⁷ .................. H01L 21/48; H01L 23/02; H01L 29/84
(52) U.S. Cl. .................. 438/51; 73/756; 257/680; 361/820
(58) Field of Search .................. 438/50, 51, 52, 438/53, 106, 117, 118, 125, 126, 127; 73/756, 431, 488; 361/820; 257/678, 680

(56) References Cited

U.S. PATENT DOCUMENTS

| 4,655,088 A | 4/1987 | Adams |
| 4,866,989 A | 9/1989 | Lawless |
| 5,266,827 A | * 11/1993 | Kato |
| 6,121,675 A | * 9/2000 | Fukamura et al. |

FOREIGN PATENT DOCUMENTS

| DE | 19754616 A1 | 6/1998 |
| DE | 19703206 A1 | 7/1998 |
| EP | 0400074 B1 | 9/1994 |
| EP | 0548470 B1 | 6/1995 |
| EP | 0568781 B1 | 5/1996 |
| JP | 10-332505 | * 12/1998 |

* cited by examiner

Primary Examiner—Charles Bowers
Assistant Examiner—Evan Pert
(74) Attorney, Agent, or Firm—Herbert L. Lerner; Laurence A. Greenberg; Werner H. Stemer

(57) ABSTRACT

A sensor assembly is formed by attaching a micromechanical semiconductor sensor in a housing. The micromechanical sensor is secured to the housing by a gel, which leads to a particularly favorable isolation between the micromechanical sensor and the housing.

13 Claims, 1 Drawing Sheet

METHOD FOR ATTACHING A MICROMECHANICAL SENSOR IN A HOUSING AND SENSOR ASSEMBLY

BACKGROUND OF THE INVENTION

1. Field of the Invention

The invention lies in the mechanical arts. More specifically, the invention relates to a method for attaching a micromechanical semiconductor sensor in a housing and a sensor assembly having a micromechanical sensor arranged in a cavity in a housing.

2. Description of the Related Art

European patent EP 0 548 470 B1 discloses a sensor assembly with a micromechanical pressure sensor. The pressure sensor is protected by a corrosion-proof cover formed of several layers. A silicone gel serves as the first layer of the cover and as a pressure transmitting medium.

U.S. Pat. No. 4,866,989 discloses a pressure transducer which has a chip on the underside of a wall of a sensor attachment. The chip is attached to the wall with a sealing ring made of silicone. The chip and the sealing ring are covered by a silicone gel. The silicone gel protects the chip against a fluid whose pressure is being measured.

German published patent application DE 137 03 206 A1 relates to a pressure sensor component with a hose attachment. A semiconductor chip is bonded to a chip carrier of a base body. The chip carrier is filled with silicone gel in order to cover the semiconductor chip. At the same time, by filling in the chip carrier, the base body is connected to a connecting element and sealed.

U.S. Pat. No. 4,655,088 discloses a pressure transducer with a one piece housing and a semiconductor chip which is secured in a defined position by means of a bonding material. The semiconductor chip is additionally protected against environmental influences by a protective material.

European patent EP 0 400 074 B1 discloses a method for fabricating a protected pressure sensor assembly. An interior space around a pressure sensor element is at least partially filled with a pressure transfer material and is closed off by a flexible, pourable diaphragm material.

European patent EP 0 568 781 B1 discloses a pressure sensor assembly with a receptacle which comprises a first recess and a second recess. A semiconductor chip is arranged on a glass substrate in the first recess cavity. Both the first recess and the second recess are provided with gelatinous material. The second recess serves as a working area from which excess gelatinous material can be removed from the first recess.

Micromechanical semiconductor sensors react sensitively to mechanical or thermal stresses in the silicon chip. In the prior art micromechanical sensors, the unhoused sensor chip is bonded to a surface. As a result, interactions with the underlying surface occur. The underlying surface expands differently than the chip, the bonding expands as a result of moisture, the mechanical clamping of the entire housing exerts stresses on the chip and the bonding agent responds to temperature changes by plastic deformation. In addition the plastic housing shrinks after the injection.

In order to reduce the interactions between the sensor chip and its underlying surface, the sensor chip is frequently glued, anodically bonded, or soldered with glass solder onto a ceramic carrier, another silicon component or Pyrex glass. Such a carrier is then bonded into the plastic housing so that two connection points, which are relevant for quality, are produced. Both connection points have effects on the characteristic curve of the sensor. Even minute air bubbles in the bonding agent lead to quality problems.

SUMMARY OF THE INVENTION

It is accordingly an object of the invention to provide a method of attaching a micromechanical semiconductor sensor in a housing and a sensor assembly, which overcome the above-mentioned disadvantages of the heretofore-known devices and methods of this general type, and which permit particularly good isolation of a semiconductor sensor from its underlying surface.

With the foregoing and other objects in view there is provided, in accordance with the invention, a method of mounting a micromechanical semiconductor sensor in a housing, which comprises the following steps:

positioning a micromechanical sensor on a supporting surface in a recess of a housing;

electrically connecting the micromechanical sensor with an electrical contact on the housing and securing the micromechanical sensor to the housing during the connecting step by generating a partial vacuum and holding the micromechanical sensor with the partial vacuum via a duct in the housing; and filling gel into the recess for attaching the micromechanical sensor to the housing, so that the micromechanical sensor is covered and held by gel.

In other words, while the electrical connection is produced, the semiconductor sensor is secured by generating a partial vacuum or a flow of air on its supporting surface.

Dispensing with an essentially rigid connection between the semiconductor sensor and its supporting surface brings about an isolation of the sensor from the housing. The semiconductor sensor is essentially secured by means of a gel which simultaneously protects the sensor against environmental influences. A fluorized silicone gel, which has very stable behavior with respect to chemical influences, is particularly suitable for this. The viscous or soft, elastic properties of the fluorized silicone gel prevent any interaction between the semiconductor sensor and the housing and thus prevent the sensor characteristic curve from being influenced. The electrical connection between the semiconductor sensor and an electrical contact on the housing can serve as an additional securing means.

It is possible to dispense with the attachment of a carrier to the semiconductor sensor and with bonding in the housing. As a result the fabrication of a sensor assembly according to the invention is made simpler and cheaper. A special diaphragm for protecting the semiconductor sensor is not necessary either.

In accordance with an added feature of the invention, gel is aspirated via the duct.

In accordance with an additional feature of the invention, a layer of gel is formed between the micromechanical sensor and the supporting surface by aspirating the gel via the duct.

In accordance with another feature of the invention, a suction device is applied to a side of the housing in which the recess is formed.

In accordance with a further feature of the invention, the duct is a groove in the housing and the duct is covered with a suction device during the aspirating process.

In accordance with another added feature of the invention, a sealing lip of a suction device is placed in an area of movement of a bonding device bonding the electrical connections to the micromechanical sensor, and wherein the sealing lip is at least partially countersunk in the housing.

With the above and other objects in view there is also provided, in accordance with the invention, a sensor assembly, comprising:

a housing having a recess formed therein with a supporting surface;

a micromechanical sensor disposed on the supporting surface;

a gel covering the sensor and exclusively securing the sensor; and the housing having a duct formed therein starting at a side of the recess and extending into the supporting surface such that the micromechanical sensor at least partially covers the duct.

In accordance with another added feature of the invention, the duct is a groove formed in the housing. In a further preferred embodiment, the duct has an opening formed on the same side of the housing as the recess.

In accordance with a concomitant feature of the invention, the recess is formed with lateral walls defining a spacing gap of from 0.05 mm to 1 mm between the micromechanical sensor and the lateral walls.

In the preferred embodiment of the invention, therefore, the sensor assembly not only has the recess but also has a duct which extends to the supporting face of the micromechanical sensor, so that an ambient pressure acts on both planar sides of the micromechanical sensor. As a result, even at a low ambient pressure a pressure differential is prevented from lifting the micromechanical sensor from its underlying surface, in which it is secured solely by the gel or at least essentially by the gel. Damage to the electrical connections to the micromechanical sensor is thus prevented.

Suitable fields of application of the invention are, for example, acceleration sensors, rotational speed sensors and chemical sensors for determining the composition of mixtures of gases. A particularly preferred field of application of the invention is the field micromechanical pressure sensors such as are used, in particular, in automotive engineering. Such pressure sensors are produced, for example, in surface micromechanics or bulk micromechanics.

Other features which are considered as characteristic for the invention are set forth in the appended claims.

Although the invention is illustrated and described herein as embodied in a method for attaching a micromechanical sensor in a housing and sensor assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
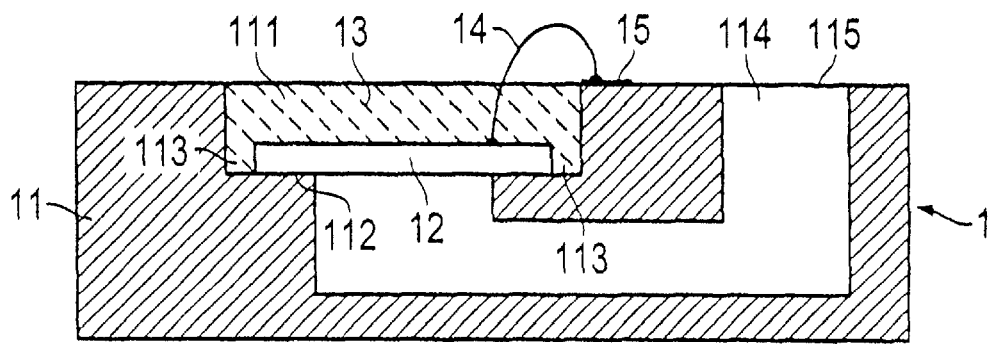
FIG. 1 is a section taken through a sensor assembly.

Referring now to the figures of the drawing in detail and first, particularly, to FIG. 1 thereof, there is seen a sensor assembly 1 for measuring an absolute pressure with a housing 11 and with a recess cavity 111 formed in the housing 11. Arranged in the recess 111 is a supporting surface 112 for a micromechanical semiconductor pressure sensor 12 and a surrounding spacing gap 113 between the wall which bounds the recess 111 and the micromechanical sensor 12. The recess is essentially filled completely by a gelatinous compound or gel 13 and, more precisely, by fluorized silicone gel.

The micromechanical sensor 12 is a silicon disk which has been treated with surface micromechanics. It is an unhoused chip. In the micromechanical sensor 12 there is a pressure chamber in which a reference pressure prevails. In addition, an evaluation circuit, which evaluates the effect of an environmental variable, that is to say in this example a deflection of the surface of the micromechanical sensor caused by pressure, is integrated in the micromechanical sensor.

The result of the evaluation is transmitted to an electrical contact 15 via an electrical connection 14, a bonding wire. The electrical contact 15 is connected to a plug-type connector via which the measurement results are transferred to a control unit of a motor vehicle, for example. The bonding wire does not assume any securing functions for the micromechanical sensor 12 whatsoever. The sensor 12 is secured in position solely by the gel 13, so that no forces act on the electrical connection 14.

The spacing gap 113 between the wall of the recess and the micromechanical sensor 12 is dimensioned in such a way that when the gel 13 is filled into the recess 111, the gel 13 can overcome the capillary forces in the gap 113. The gap must not be too narrow, so that no undesired interaction can occur between the micromechanical sensor 12 and the housing 11. However, the gap must not be too wide since otherwise the gel 13 would no longer be capable of sufficiently securing the micromechanical sensor 12. Vibration of the micromechanical sensor could lead to damage to the electrical connection 14, in particular to rupturing of bonding wires.

A suitable width of the gap 113 would be approximately between 0.05 millimeters and 1 millimeter. For a micromechanical sensor with a diameter of approximately 5 millimeters, a gap width of 0.1 millimeter to 0.3 millimeters is particularly advantageous.

The supporting surface 112 can be roughened or provided with a thin vulcanization in order to prevent the micromechanical sensor from slipping when one or more electrical connections 14 are attached.

In order to make it easier to center the micromechanical switch 12 in the recess 113 when it is being inserted, the surrounding gap 113 can be interrupted by very narrow projections which point "radially" in the direction of the inserted micromechanical sensor 12. In order to be able to absorb particularly powerful impacts, the micromechanical sensor 12 may be additionally snapped into the recess 111. However, such measures are not necessarily for customary vibration stresses which occur in motor vehicles.

The supporting surface 112 is interrupted in a central region by a duct 114. The duct 114 extends from the micromechanical sensor 12 to an opening 115 which is located on the same side of the housing 114 as the recess 111.

Although the housing 11 is simpler to produce if the duct 114 extends from the recess 111 to that surface of the housing 11 which lies opposite the recess, it is more favorable for the fabrication of the sensor assembly if the opening 115 of the duct 114 is arranged on the side of the housing 11 from which the micromechanical sensor 12 can be inserted into the housing. In the latter case, all the production processes during the fabrication of the sensor assembly 1 can be carried out from a single side.

In order to fabricate the duct, an encapsulation preform is fabricated in that plug-contacts which are intended to connect the sensor assembly 1 to an external connection are encapsulated with plastic together with a tubelet, which is later intended to be arranged parallel to the supporting surface 112 in the housing 11. Then, the encapsulation preform is inserted into an injection molding tool in order to fabricate the housing 11 in plastic. In the process, in each case the recess ill and the opening 115 are fabricated by means of two slide bars. The two slide bars close the tubelet during the injection molding process so that, after the end of the production process, a continuous duct has been produced from the supporting surface 112 as far as the opening 115.

The duct 114 ensures that the micromechanical sensor 12 is subjected to essentially the same pressure conditions at its two planar sides. The securing forces which are to be applied by the gel 13 therefore only need to be relatively small.

While the electrical connections 14, usually bonded connections, are being fabricated, the micromechanical sensor 12 can be secured over the duct 114 by producing a partial vacuum or a vacuum. The micromechanical sensor 12 is prevented from slipping during the suction process by the vulcanization, already described, or by a supporting surface 112 with a high coefficient of friction. Alternatively, the supporting surface 112 may have a very narrow surrounding web on which the micromechanical sensor 12 rests and which surrounds the opening of the duct 114 which opens into the supporting surface 112. During the suction process, the sensor 12 is pushed against the web so that the latter deforms. As a result, optimum sealing of the sensor 12 with respect to the duct 14 is achieved and the sensor is reliably prevented from moving laterally during the production process.

Therefore, the duct 114 performs both the function of a pressure equalization duct and the function of a suction duct. After the electrical connections 14 have been fabricated, the recess 111 is filled with gel 13 which finally fixes the micromechanical sensor 12 in position and protects it against environmental influences. The suction process for securing the micromechanical sensor 12 can be continued in order to fill in the gel 13 so that penetration into the gap 113 is supported. In addition, gel can be pulled between the supporting surface 112 and the micromechanical sensor 12 by the suction. In this case, the micromechanical sensor 12 is completely isolated from the housing 11. In order to support the sucking in of the gel, grooves, which extend from the gap 113 to the duct 114, may be provided in the supporting surface 112.

Figure 2:
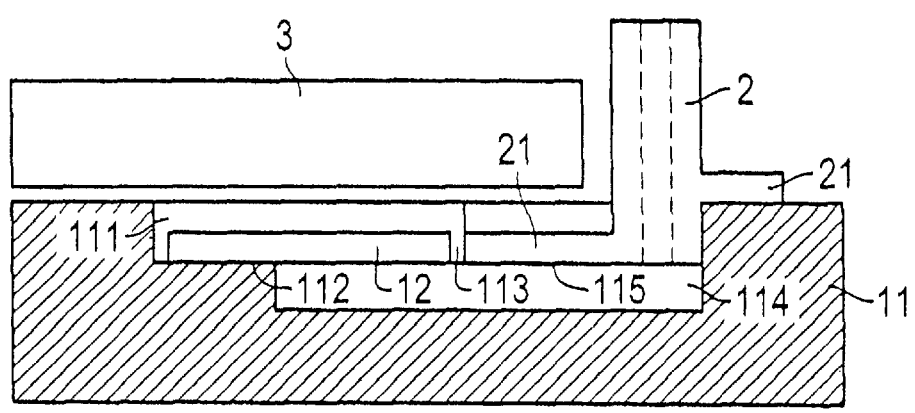
FIG. 2 is a section taken through a housing onto which a suction device is fitted.

FIG. 2 illustrates the fabrication of a sensor assembly according to a further exemplary embodiment of the invention.

The duct 114 is embodied as a groove which extends from outside the recess 111 into it and deepens it. The duct 114 therefore starts to the side of the recess 111. The duct 114 is accessible from the surface of the housing 11. It extends at least as far as a central region of the supporting surface 112.

A suction device 2 is formed with sealing lips 21 for covering and sealing the opening 115 of the duct 114. A sealing lip 21 covers that region of the duct 114 which is located outside the recess 111. The sealing lip 21 can project into the recess 111 and, in doing so, cover the gap 113. When the suction device is actuated, the micromechanical sensor is pulled against the edge of the sealing lip 21 and thus aligned in the optimum position. If the suction device is placed against the housing 11 before the insertion of the micromechanical sensor 12, it can support the centering of the micromechanical sensor 12 in the recess 111.

The part of the sealing lip 21 which faces the micromechanical sensor 12 is completely countersunk in the duct 114. Therefore, electrical connections 14 between the micromechanical sensor 12 and electrical contacts 14 can be bonded without difficulty although the sealing lip 21 lies in a bonding shadow, that is to say a movement region of a bonding device 3.

Figure 3:
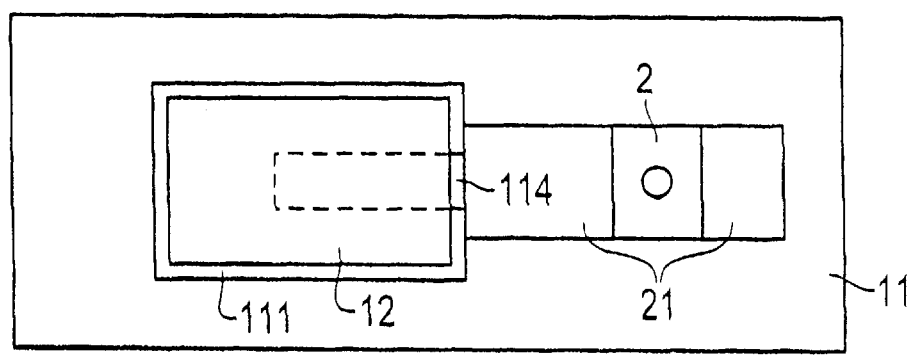
FIG. 3 is a plan view of the configuration of FIG. 2.

FIG. 3 illustrates the covering of the duct 114 by the sealing lip 21 of the suction device 2. The broken line signifies the course of the duct in the supporting surface 112 for the micromechanical sensor 12.

I claim:

1. A method of mounting a micromechanical semiconductor sensor in a housing, which comprises the following steps:

positioning a micromechanical sensor on a supporting surface in a recess of a housing;

electrically connecting the micromechanical sensor with an electrical contact on the housing and securing the micromechanical sensor to the housing during the connecting step by generating a partial vacuum and holding the micromechanical sensor with the partial vacuum via a duct in the housing; and filling gel into the recess for attaching the micromechanical sensor to the housing, so that the micromechanical sensor is covered and held by gel.

2. The method according to claim 1, which comprises aspirating gel via the duct.

3. The method according to claim 2, which comprises applying a suction device to a side of the housing in which the recess is formed.

4. The method according to claim 2, wherein the duct is a groove in the housing and which further comprises covering the duct with a suction device during the aspirating process.

5. The method according to claim 1, which comprises aspirating gel via the duct to form a layer of gel between the micromechanical sensor and the supporting surface.

6. The method according to claim 5, which comprises applying a suction device to a side of the housing in which the recess is formed.

7. The method according to claim 5, wherein the duct is a groove in the housing and which further comprises covering the duct with a suction device during the aspirating process.

8. The method according to claim 1, which comprises placing a sealing lip of a suction device in an area of movement of a bonding device bonding electrical connections to the micromechanical sensor, and wherein the sealing lip is at least partially countersunk in the housing.

9. A sensor assembly, comprising:

a housing having a recess formed therein with a supporting surface;

a micromechanical sensor disposed on said supporting surface;

a gel covering said sensor and exclusively securing said sensor; and said housing having a duct formed therein starting at a side of said recess and extending into said supporting surface such that said micromechanical sensor at least partially covers said duct.

10. The sensor assembly according to claim 9, wherein said duct is a groove formed in said housing.

11. The sensor assembly according to claim 9, wherein said duct has an opening formed on a same side of said housing as said recess.

12. The sensor assembly according to claim 9, wherein said gel is a fluorized silicone gel.

13. The sensor assembly according to claim 9, wherein said recess is formed with lateral walls defining a spacing gap of a width from 0.05 mm to 1 mm between said micromechanical sensor and said lateral walls.

* * * * *